April 13, 1926. 1,580,669
C. NAGEL
AUTOMATIC WEIGHING APPARATUS
Filed March 19, 1924    2 Sheets-Sheet 1
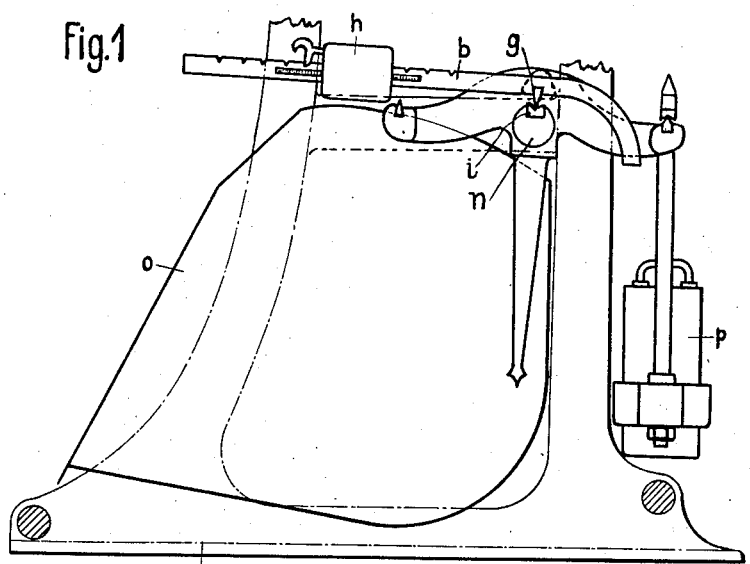
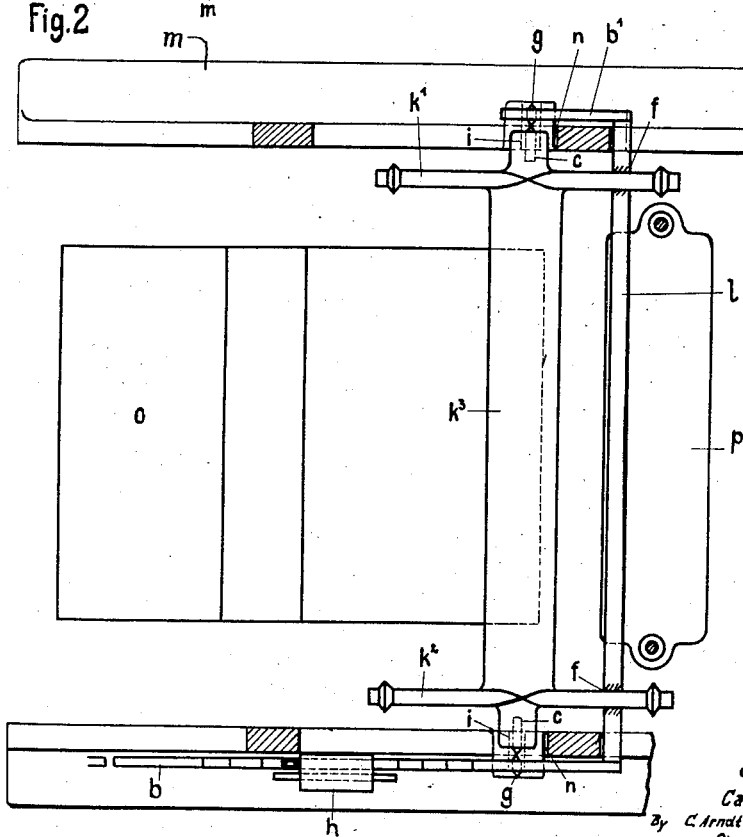
Inventor:
Carl Nagel
By C. Arndt and Dr. Ing. P. Bock April 13, 1926.
C. NAGEL
1,580,669
AUTOMATIC WEIGHING APPARATUS
Filed March 19, 1924  2 Sheets-Sheet 2
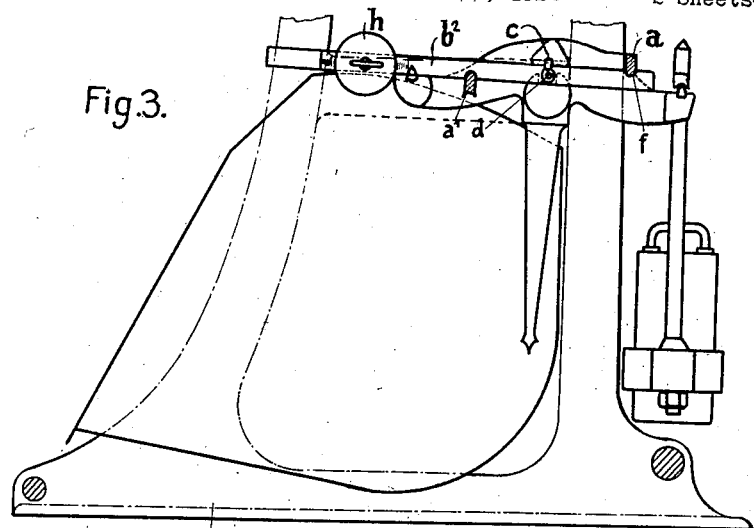
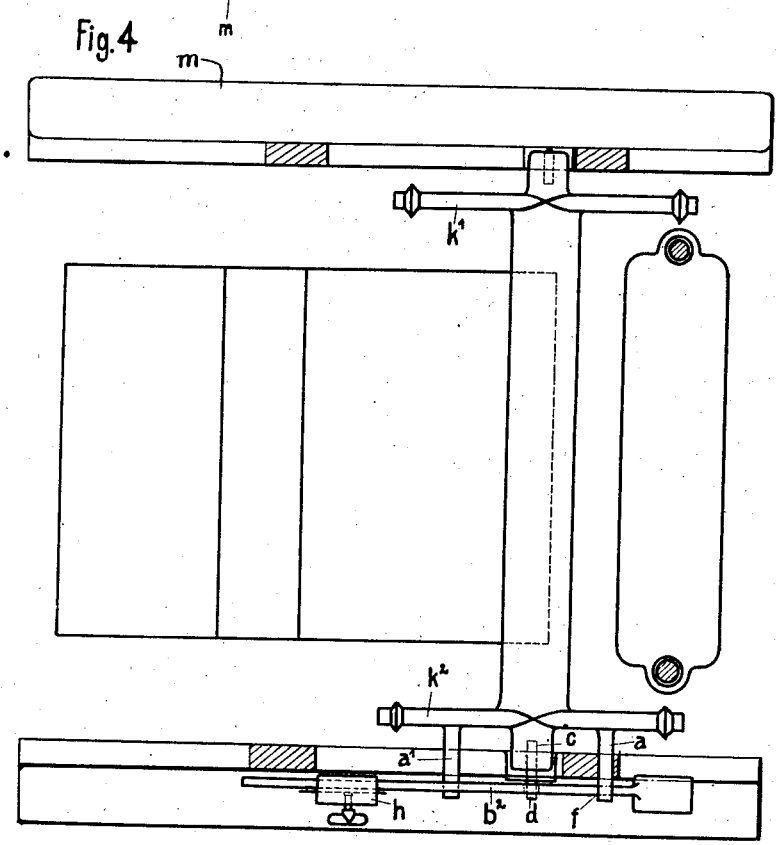
Inventor:
Carl Nagel
By C. Arndt and Dr.-Ing. P. Bock
Attorneys Patented Apr. 13, 1926.

1,580,669

UNITED STATES PATENT OFFICE.

CARL NAGEL, OF GLIESMARODE, NEAR BRUNSWICK, GERMANY.

AUTOMATIC WEIGHING APPARATUS.

Application filed March 19, 1924. Serial No. 700,355.

*To all whom it may concern:*

Be it known that I, CARL NAGEL, engineer, a citizen of Germany, residing at Gliesmarode, near Brunswick, Germany, have invented certain new and useful Improvements in Automatic Weighing Apparatus (for which I have filed application in Germany, March 29, 1923), of which the following is a specification.

My invention relates to automatic weighing apparatus, and more particularly in weighing apparatus of the type in which a subsidiary weight is provided which temporarily counteracts the main weight, either for compensating the flow of the material being weighed or for dividing the weighing operation into two steps one for rough weighing and the other for accurate weighing. The object of the improvements is to provide a weighing apparatus of this type which is simple in construction, and with this object in view my invention consists in disposing the lever carrying the subsidiary weight on the scale beam and so that it can be set at any time into inoperative position in which it does not act on the beam.

For the purpose of explaining the invention two examples embodying the same have been shown in the accompanying drawings, in which the same letters of reference have been used in all the views to indicate corresponding parts. In said drawings,—

Fig. 1 is an elevation showing the weighing apparatus,

Fig. 2 is a top plan view thereof,

Fig. 3 is an elevation showing a modification, and

Fig. 4 is a top plan view of the modification shown in Fig. 3.

In the example shown in Figs. 1 and 2 the weighing apparatus consists of uprights $m$ each formed with a lug $n$ having a recessed bearing $i$ fitted therein, which bearings provide supports for the knife edges $c$ of a scale beam. As shown the scale beam consists of two members $k^1$ and $k^2$ connected with each other by a shaft $k^3$, and it carries a scale pan $o$ and a weight $p$. The lugs $n$ and the bearings $i$ are elongated beyond the knife blades $c$ and the projecting portions provide supports for knife blades $g$ of arms $b$ and $b^1$ connected with each other by a bar $l$. The arm $b$ extends beyond its fulcrum and its free end carries a subsidiary weight $h$. The bar $l$ engages the beam $k^1$, $k^2$ from the bottom side at the points $f$ so as to counteract the main weight $p$. For accurate weighing the scale beam is relieved of the subsidiary weight by lifting the free end of the lever $b$ so far that the bar $l$ is out of engagement with the scale beam.

In the modifications shown in Figs. 3 and 4 the construction of the weighing apparatus proper is the same as has been described with reference to Figs. 1 and 2. But in lieu of the frame $b^1$, $b$, carrying the subsidiary weight a lever $b^2$ is provided at one side of the scale beam, and the bearings $i$ of the frame on the lugs $n$ are dispensed with. As shown the arm $k^2$ is provided at opposite sides of its fulcrum with a pair of lugs $a$, $a^1$, and the lever $b^2$ is supported by the said lugs by bearing thereon respectively from the top and bottom sides thereof. To the frame $m$ a subsidiary pivot bolt $d$ is fixed which passes through a comparatively large hole of the lever $b^2$ and which is therefore out of frictional engagement with the bolt $d$. As shown the bolt is disposed coaxially of the fulcrum of the beam, but it will be understood that exact alignment is not necessary, provided that the clearance of the bolt $d$ within the hole of the lever $b^2$ is sufficient to avoid frictional engagement between the bolt and the lever. For relieving the scale beam of the pressure of the subsidiary weight $h$ the lever $b^2$ is elevated at its free end until it is out of position for engagement with the lugs $a$ and $a^1$ and bears on the bolt $d$.

To prevent displacement of the lever $b^2$ it is formed with recesses engaged by the lugs $a$ and $a^1$. The lugs $a$ and $a^1$ may be provided at any other suitable part of the scale beam.

While in describing the invention reference has been made to particular examples embodying the same I wish it to be understood that my invention is not limited to the constructions shown in the drawings, and that various changes may be made in the general arrangement of the apparatus and the construction of its parts without departing from the invention.

I claim:

1. In a weighing apparatus, the combination with the scale beam and weighing members connected therewith, of a lever attached to and acting on said beam so as to swing with it and adapted to be set in position clear of the scale beam, and means connected with said lever counteracting the main weight.

2. In a weighing apparatus, the combination with the scale beam and weighing members mounted thereon, of a lever rockingly mounted coaxially to the fulcrum of said scale beam provided with a projection adapted to act on said scale beam from the bottom side and to be set in position clear of the same by lifting the one end of the lever.

3. In a weighing apparatus, the combination, with the scale beam, and weighing members mounted thereon, of a lever loosely engaging said scale beam at opposite sides of the fulcrum thereof respectively from above and below, a relatively fixed fulcrum for said lever, and means acting on said lever and counteracting the main weight.

4. In a weighing apparatus, the combination, with the scale beam, and the weighing members mounted thereon, of a lever loosely engaging said scale beam at opposite sides of the fulcrum thereof respectively from above and below, a relatively fixed fulcrum for said lever normally out of engagement therewith and adapted to engage the same when rocking the same out of engagement with the scale beam, and means acting on said lever and counteracting the main weight.

In testimony whereof I have affixed my signature.

CARL NAGEL.